Sept. 24, 1963          R. N. ANDERSON                3,104,821
                        TRAVELING SPRINKLER
Filed Nov. 14, 1962                                 4 Sheets-Sheet 1
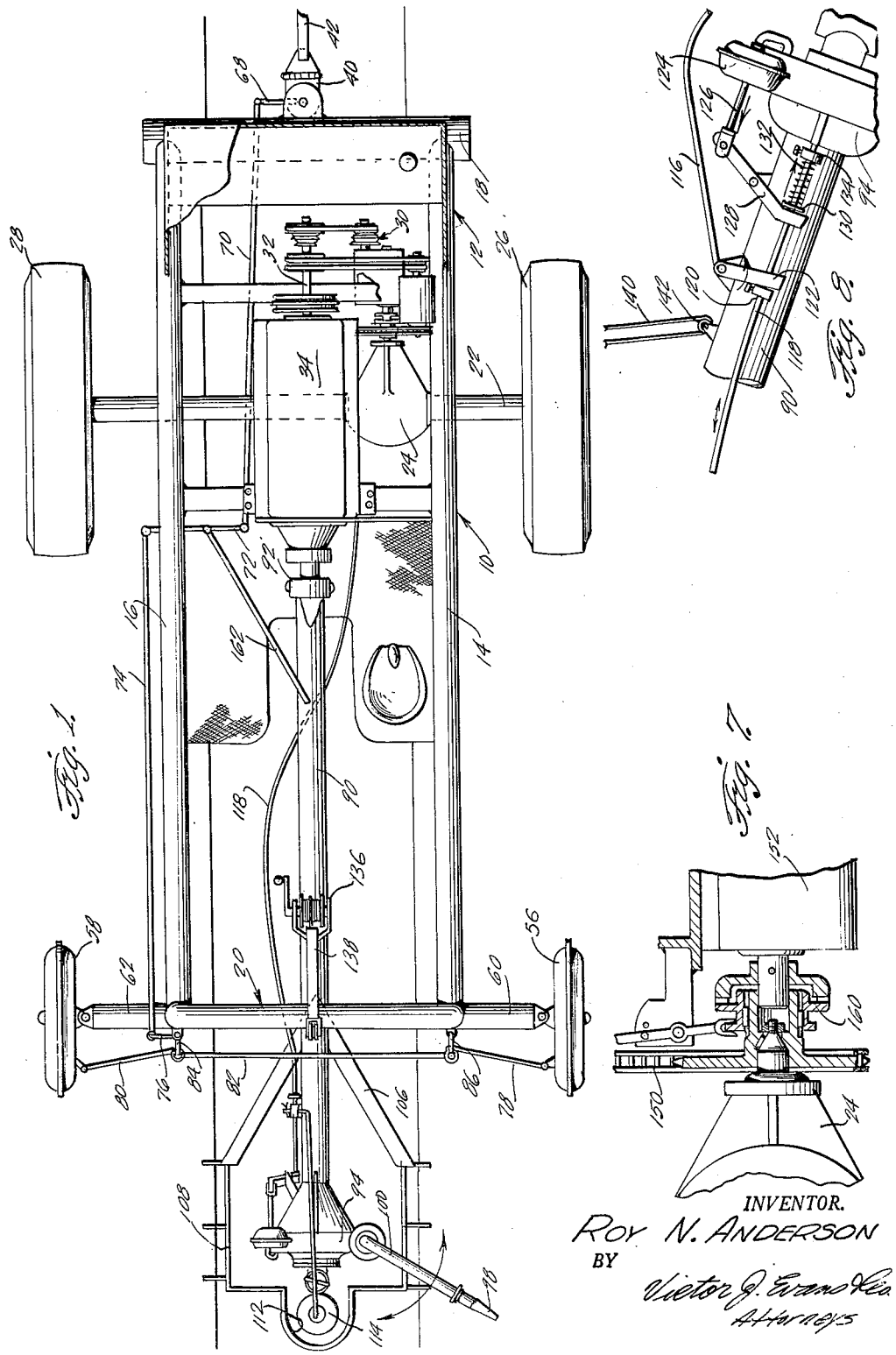
INVENTOR.
ROY N. ANDERSON
BY

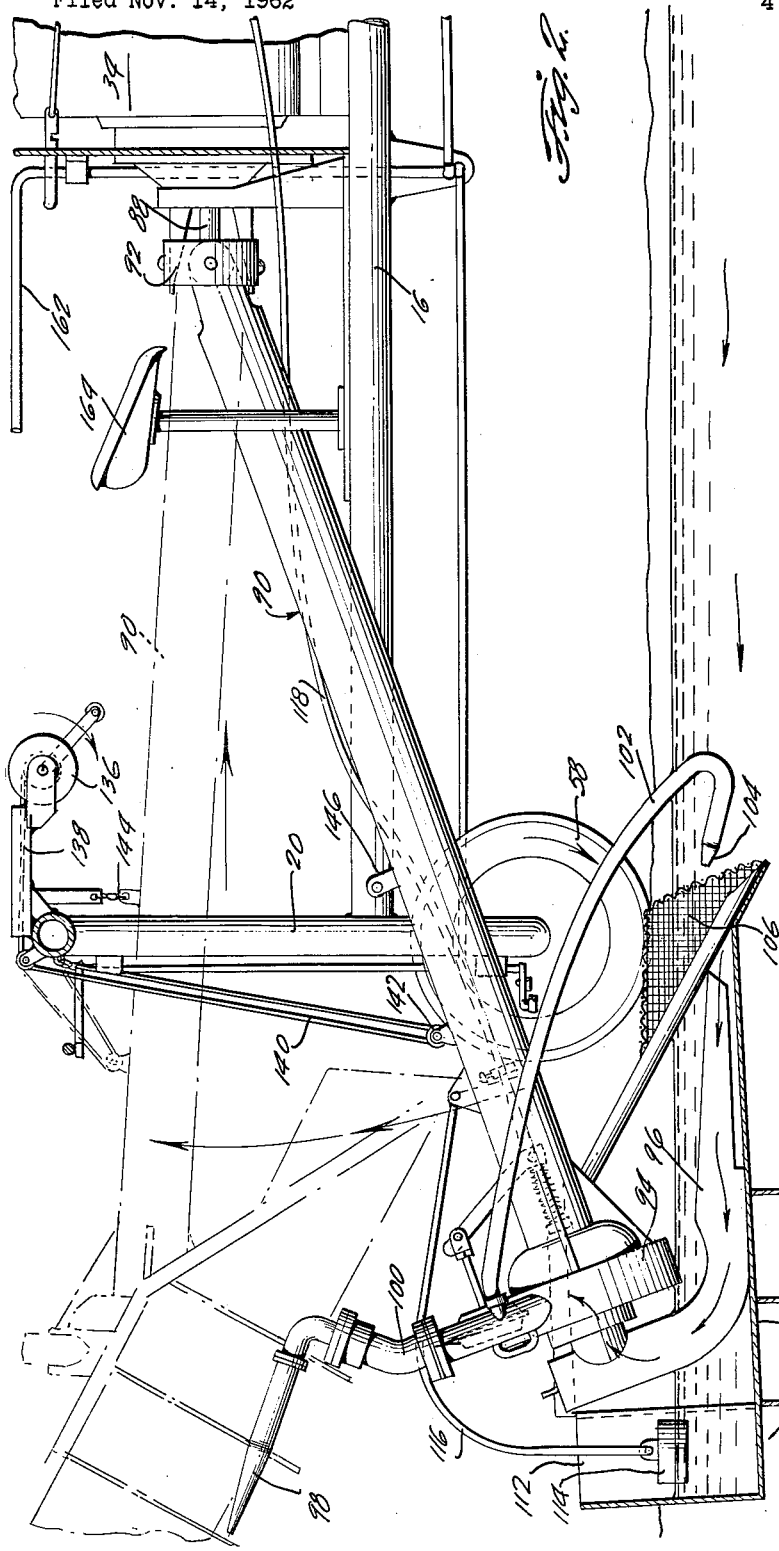

Sept. 24, 1963  R. N. ANDERSON  3,104,821
TRAVELING SPRINKLER
Filed Nov. 14, 1962  4 Sheets-Sheet 3
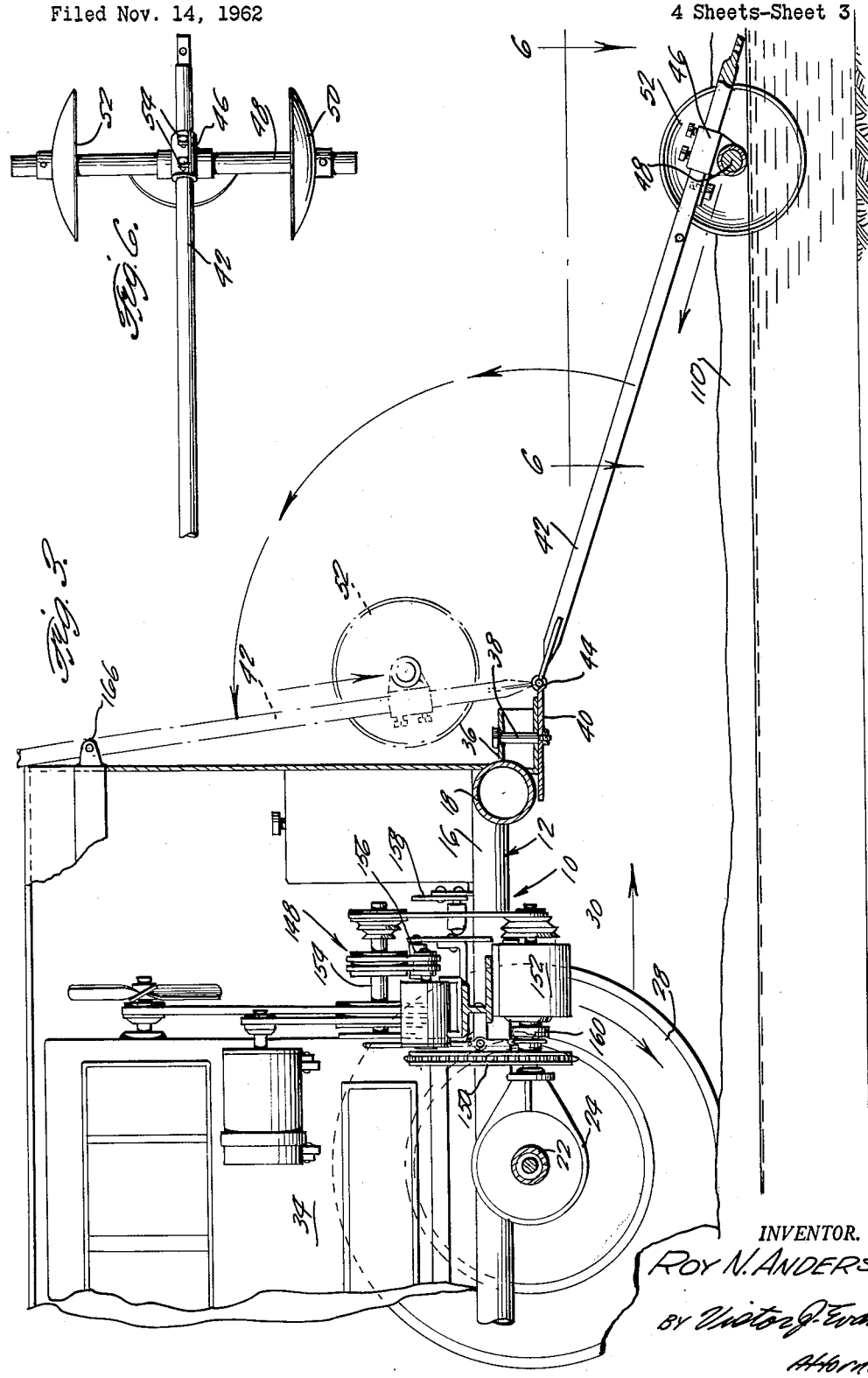
INVENTOR.
Roy N. Anderson

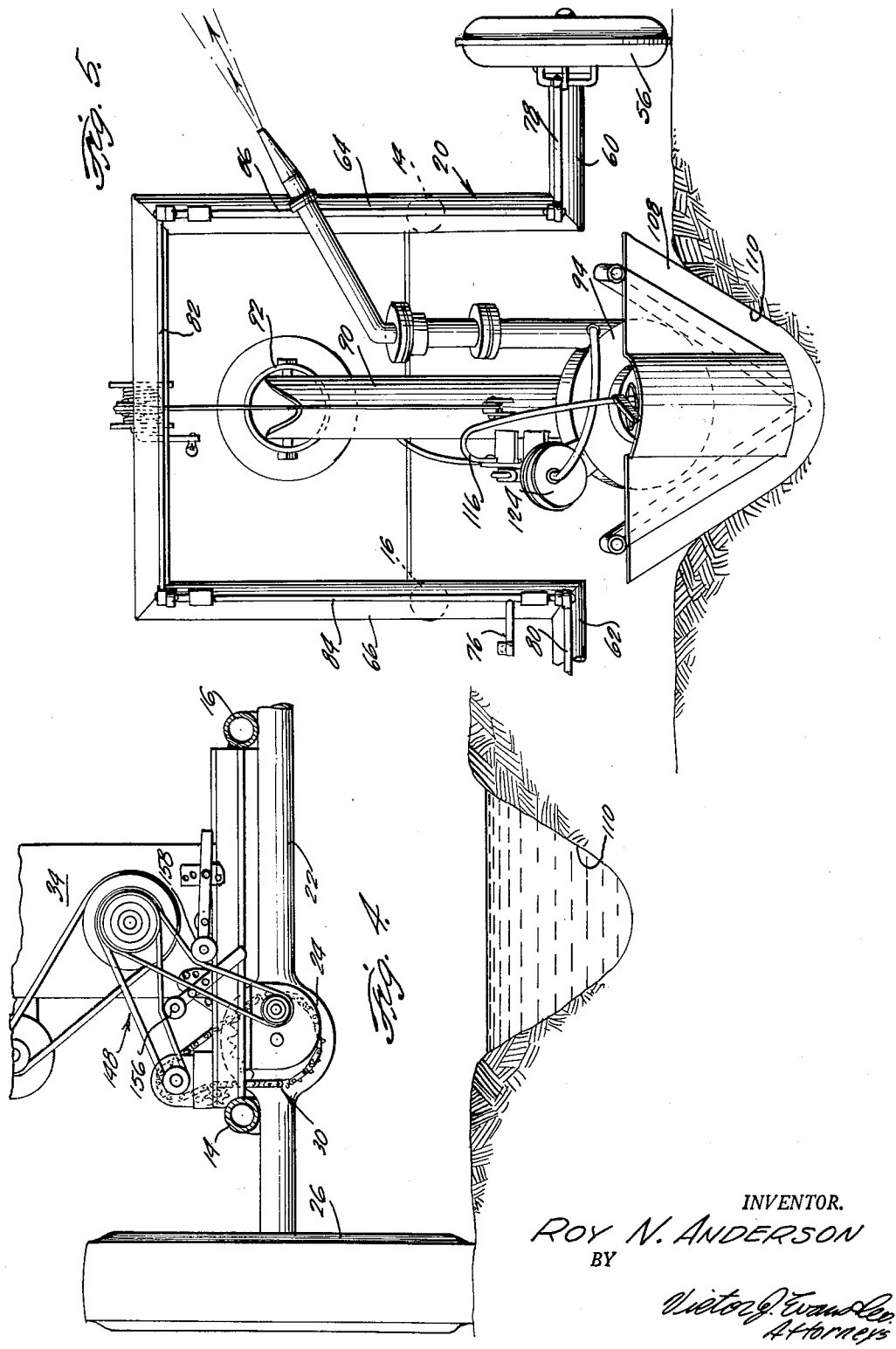

United States Patent Office 3,104,821
Patented Sept. 24, 1963

3,104,821
TRAVELING SPRINKLER
Roy N. Anderson, Clovis, N. Mex.
Filed Nov. 14, 1962, Ser. No. 237,512
3 Claims. (Cl. 239—179)

The present invention relates to agricultural implements generally and in particular to a traveling sprinkler for straddling an irrigation ditch.

An object of the present invention is to provide an irrigator with a traveling dam or gate which will block the water in a ditch so that the water may be used for irrigation, the irrigator or sprinkler traveling on the sides of the ditch automatically and without attention.

Another object of the present invention is to provide a traveling sprinkler or irrigator which may be left unattended for hours at a time, one which will travel at idling speeds as low as two feet per minute when desired, one which will slow down when the level of water in the ditch gets low, and one which will automatically speed up when the level of the water in the ditch rises.

A further object of the present invention is to provide a traveling sprinkler which will follow a curved or straight ditch without deviating therefrom, one which as a trash cutter so that the pump of the sprinkler does not get clogged, and one which may be manufactured at reasonable cost.

A still further object of the present invention is to provide a traveling sprinkler having an efficient power plant connected to the pump thereof, the pump being situated so as to operate at a high level of efficiency and requiring no priming or other attention between periods of activity.

These and other objects and advantages of the present invention will be fully apparent from the following description when taken in connection with the annexed drawings, in which:

FIGURE 1 is a top plan view of the sprinkler according to the present invention, a portion of the guide arm at the forward end of the vehicle being broken away, FIGURE 2 is a side elevational view of the rearward end of the vehicle, on an enlarged scale and with one of the rear wheels removed, FIGURE 3 is an elevational view of the forward end of the vehicle with one of the drive wheels removed, the scale being the same as FIGURE 2, FIGURE 4 is a fragmentary elevational view showing one of the drive wheels and the drive mechanism connected thereto, FIGURE 5 is a fragmentary elevational view of the rear portion of the apparatus, FIGURE 6 is a view taken on the line 6—6 of FIGURE 3, FIGURE 7 is a fragmentary view on an enlarged scale of the clutch mechanism, parts being shown in section, and FIGURE 8 is an elevational view of the pump mechanism, shown on an enlarged scale.

Referring in detail to the drawings, in which like numerals indicate like parts throughout the several views, the traveling sprinkler of the present invention comprises a wheeled vehicle 10 having a frame designated generally by the reference numeral 12. The frame 12 includes spaced parallel horizontally disposed side members 14 and 16, a front member 18 connecting the forward ends of the side members 14 and 16 together, and an inverted U-shaped rear member 20 connecting the rearward ends of the side members 14 and 16 together.

Transversely arranged with respect to the frame 12 and intermediate the ends thereof is a drive axle housing 22 having a differential 24 intermediate the ends thereof. Mounted on the ends of the housing 22 are drive wheels 26 and 28 drivably connected through the differential 24 and a power transmission mechanism 30 to the output shaft 32 of the prime mover or engine 34.

Projecting forwardly from the frame member 18 is a box structure 36 having a bolt 38 extending vertically therethrough. A horizontally disposed plate 40 is swingably mounted on the lower end of the bolt 38 for rotation about the bolt 38 as a vertical axis. To one edge of the plate 40 is hingedly connected a guide arm 42, the hinge pin 44 connecting the arm 42 to the plate 40 constitutes a horizontal axis about which the guide arm 42 may be swung.

Slidably mounted upon the arm 42 is a housing 46 through which projects a shaft 48 having on the ends thereof rotatable guide wheels 50 and 52.

Lock screws 54 threaded in holes provided in the housing 46 serve as means by which the shaft 48 is adjustably positioned on the arm 42. When the arm 42 is swung to the dotted line position in FIGURE 3 the shaft 48 and wheels 50 and 52 may be brought to the lower end of the arm 42.

An important feature of the present invention resides in the provision of linkage means operatively connecting the guide arm 42 to the steerable rear wheels 56 and 58 which are mounted upon the free ends of extensions 60 and 62 projecting outwardly from the lower ends of the legs 64 and 66, respectively, of the vehicle rear member 20.

This means consists in a first lever 68 having one end fixedly secured to the plate 40 and having the other end pivotally connected to a first link 70. The other end of the link 70 is pivotally connected to a second lever 72 which is pivotally mounted upon the frame side member 16 intermediate the ends thereof.

The other end of the lever 72 is pivotally connected to a second link 74 at one end of the latter, the other end of the link 74 being pivotally connected to a pitman arm 76 which is pivotally mounted intermediate its ends on the frame rear member 20. Steering arms 78 and 80 and a connecting arm 82 connect the wheels 56 and 58 to the pitman arm 76, as shown most clearly in FIGURE 1.

As shown in FIGURE 5 it will be seen that the pitman arm 76 includes a vertical extension portion 84 having its upper end connected to one end of the arm 82 and having its other end connected to one end of the steering arm 80. Another extension portion 86 of the pitman arm 76 has one end connected to the other end of the connecting arm 82 and its other end connected to the steering arm 78.

It will be seen that upon execution of swinging movement of the guide arm 42 about the bolt 38 as an axis, the linkage connecting the first lever 68 to the steering wheels 56 and 58 will effect the steering movement of the wheels 56 and 58.

Another important feature of the present invention resides in the provision of a pump and dam or gate mechanism connected to the power take-off shaft 88 on the end of the engine 34 remote from the mechanism 30.

A drive housing 90 is connected by a universal joint 92 to the rearward end of the engine 34.

One end of the housing 90 carries a pump 94 having an inlet conduit 96 connected thereto.

A nozzle 98 is connected to the outlet of the pump 94 by means of a conduit 100.

Part of the output of the pump 94 is diverted through a tube 102 which terminates in a nozzle 104 projecting rearwardly and contiguous to a trash screen 106.

Rearwardly of the pump 94 and supported on the housing 90 is a gate or dam 108 which blocks the irrigation ditch 110 as shown most clearly in FIGURE 5.

Formed integrally with the dam 108 is a well 112 in which there is a float 114 on one end of a lever 116.

Control means is provided operatively connected to the engine 34 for controlling the power output of the engine 34 responsive to the level of the water in the well 112. This control means includes an auxiliary throttle rod 118 having adjustable stop 120 thereon, the stop being in the path of movement of an arm 122 connected to the lever 116, as shown most clearly in FIGURE 8.

Upon dropping of the level of the water in the ditch 110 the lever 116 will move downwardly and will advance the arm 122 against the stop 120 to throttle down the engine 34.

Another control is provided for the pump 94 and this is responsive to pressure from the pump in a diaphragm chamber 124 having its actuating arm 126 connected to one end of a lever 128 pivotally connected to the adjacent portion of the housing 90. A stop 130 is biased in one direction by a spring 132 which has one end bearing against the stop 130 and the other end bearing against a collar 134 secured on the control rod 118. Upon a reduction of pressure in the pump 94 due to the trash collecting on the screen 106, the lever 120 will be shifted to pull on the control rod 118 to thereby increase the speed of the engine 34 and thereby increase the output of the pump which will in turn, by means of the nozzle 104 will clean the trash from the screen 106.

Another feature of the invention resides in the provision of means for raising and lowering the housing 90 and the attached dam 108. This means consists in a winch 136 carried on the end of a support 138 which is mounted on the rear frame member 20. The winch 136 winds up a cable 140 which travels over a pulley 142 fixed to the housing 90 rearwardly of the frame member 20.

After the housing 90 has been raised to the dotted line position shown in FIGURE 2, it may be fastened there by means of a chain 144 engaging a lug 146 on the housing 90.

The vehicle 10 is caused to travel by means of a gear chain designated generally by the numeral 148. Either the gear chain has a direct drive through a chain 150 or an indirect drive through a gear reduction unit 152, such chain 150 and reduction unit 152 being drivably connected to the power output shaft 154 with belt tightening means, as at 156 and 158, and a selective clutch means 160, all of conventional construction for which no invention is claimed.

In use, the device of the present invention may be driven at a relatively high speed on a highway through the direct drive chain 150 and at low speeds when straddling a ditch with the dam 108 blocking the water in the ditch 110. A steering arm 162 is operatively connected to the lever 72 and is contiguous to a seat 164 provided for an operator of the vehicle 10.

When the dam 108 has been lowered into the ditch 110 then the arm 42 is unhooked from a lug 166 on the front of the vehicle 10 and the arm 42 is lowered to the position shown in FIGURE 3 in which the wheels 50 and 52 engage the sides of the ditch 110. Thereafter, the operator after starting the vehicle in motion may leave the seat 164 and the machine will travel by itself taking water from the ditch and throwing the water at a great velocity from the nozzle 98.

When the water level recedes in the ditch the control will slow down the machine to idling speed and this will be noticed from a distance by the operator. Without attention, on increase of water in the ditch, the machine will again travel along the ditch whether the ditch is straight or curved.

While only a preferred embodiment of the present invention is shown and described, it is contemplated that numerous changes and modifications may be made within the spirit of the invention as set forth in the appended claims.

What is claimed is:

1. In an irrigating sprinkler to straddle an irrigation ditch, a vehicle having forward drive wheels and steerable rear wheels rollably engaging the ground surface on each side of the ditch, a pair of guide wheels engaging the walls of said ditch, said guide wheels being rotatably mounted on a horizontally disposed shaft, a guide arm normally extending forwardly of said vehicle and having one end connected to said vehicle for swinging movement about a vertical axis and also for swinging movement from the normal position to an upright position, said shaft being mounted on said arm for movement therealong, means for adjustably locking said shaft on said arm, linkage means operatively connecting said arm to said rear wheels so that said rear wheels are steered responsive to swinging movement of said arm about said vertical axis, a prime mover carried by said vehicle drivably connected to said front wheels, a pump carried by said vehicle and driven by said prime mover, a dam depending from said vehicle and adapted to block said ditch, said pump having an inlet at a level with said dam and on one side thereof, and an upright nozzle connected in communication with the outlet of said pump, said nozzle being adjustable about another vertical axis.

2. In an irrigating sprinkler to straddle an irrigation ditch, a vehicle having forward drive wheels and steerable rear wheels rollably engaging the ground surface on each side of the ditch, a pair of guide wheels engaging the walls of said ditch, said guide wheels being rotatably mounted on a horizontally disposed shaft, a guide arm normally extending forwardly of said vehicle and having one end connected to said vehicle for swinging movement about a vertical axis and also for swinging movement from the normal position to an upright position, said shaft being mounted on said arm for movement therealong, means for adjustably locking said shaft on said arm, linkage means operatively connecting said arm to said rear wheels so that said rear wheels are steered responsive to swinging movement of said arm about said vertical axis, a prime mover carried by said vehicle drivably connected to said front wheels, a pump carried by said vehicle and driven by said prime mover, a dam depending from said vehicle and adapted to block said ditch, said pump having an inlet at a level with said dam and on one side thereof, an upright nozzle connected in communication with the outlet of said pump, said nozzle being adjustable about another vertical axis, and control means operatively connected to said prime mover for controlling the power output thereof responsive to the level of water in said ditch.

3. In an irrigating sprinkler to straddle an irrigation ditch, a vehicle having forward drive wheels and steerable rear wheels rollably engaging the ground surface on each side of the ditch, a pair of guide wheels engaging the walls of said ditch, said guide wheels being rotatably mounted on a horizontally disposed shaft, a guide arm normally extending forwardly of said vehicle and having one end connected to said vehicle for swinging movement about a vertical axis and also for swinging movement from the normal position to an upright position, said shaft being mounted on said arm for movement therealong, means for adjustably locking said shaft on said arm, linkage means operatively connecting said arm to said rear wheels so that said rear wheels are steered responsive to swinging movement of said arm about said vertical axis, a prime mover carried by said vehicle drivably connected to said front wheels, a pump carried by said vehicle and driven by said prime mover, a dam depending from said vehicle and adapted to block said ditch, said pump having an inlet at a level with said dam and on one side thereof, an upright nozzle connected in communication with the outlet of said pump, said nozzle being adjustable about another vertical axis, and control means including a float operatively connected to said prime mover for controlling the power output thereof responsive to the level of water in said ditch.

References Cited in the file of this patent
UNITED STATES PATENTS

| | | |
|---|---|---|
| 2,718,433 | Poyner et al. | Sept. 20, 1955 |
| 2,880,937 | King | Apr. 7, 1959 |
| 3,009,645 | Nugent | Nov. 21, 1961 |